A. PETTINGILL.
COTTON PICKER.

No. 85,532. Patented Jan. 5, 1869.

Witnesses.
Henry C. Houston
Wm. Franklin Seavy

Inventor.
Albert Pettingill
Per W. H. Clifford Atty.

ALBERT PETTINGILL, OF EAST LIVERMORE, MAINE.

Letters Patent No. 85,532, dated January 5, 1869.

IMPROVEMENT IN COTTON-PICKERS.

The Schedule referred to in these Letters Patent and making part of the same.

*To all whom it may concern:*

Be it known that I, ALBERT PETTINGILL, of East Livermore, in the county of Androscoggin, and State of Maine, have invented a new and useful Improved Cotton-Picker; and I hereby declare the following to be a full, clear, and exact description thereof, which will enable others to make and use my invention, reference being had to the accompanying drawings, forming part of this specification, in which—

Figure 1:
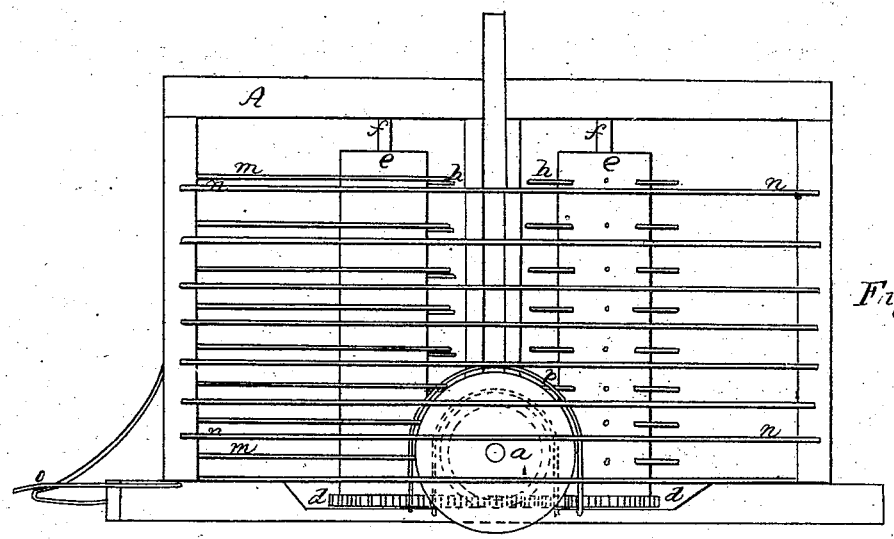
Figures 2, 3:
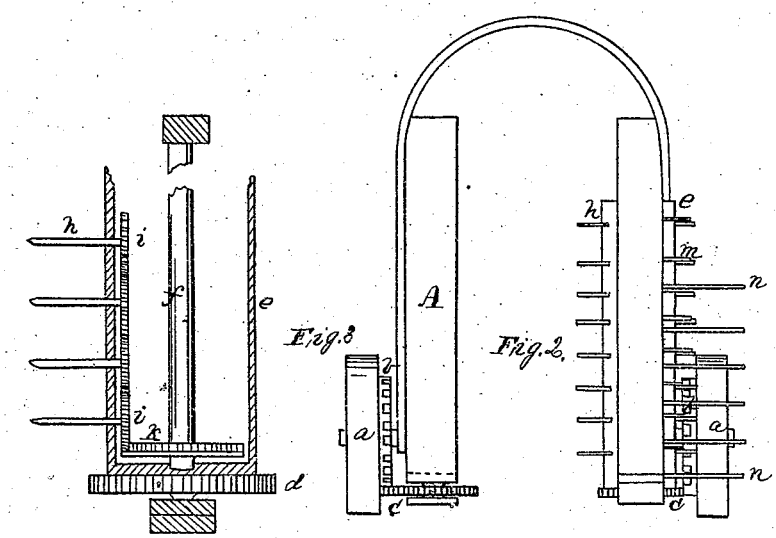

Figure 1 is a side elevation of my invention.
Figure 2 is an end elevation of the same.
Figure 3 is a vertical section of one of the cylinders, showing the shaft, spindles, and gears.

My invention consists of a machine for picking cotton, in which motion is imparted to cylinders and spindles by the motion of the wheels upon which the machine moves as it is drawn along the field.

It also consists in an arrangement of devices for winding the cotton from the bolls on to a set or sets of spirals; and also of an arrangement for removing the cotton from the spirals when thus taken from the stocks, and wound on to the spirals.

My machine is contained within a convenient frame, represented by A in the drawings.

This frame is so constructed as to have a row of the plants between its two sides as it is drawn along. An illustration of this formation is seen in the end view in fig. 2.

The machine is set upon wheels or trucks, (see $a$,) which revolve upon shafts attached to the frame A.

Upon the inner sides of these wheels are attached gears $b$, which match the gears $c$, revolving horizontally.

These gears $c$ match other gears, $d$, placed at or near the bottoms of the cylinders $e$.

These cylinders are placed vertically in the sides of the frame of the machine, and may be of any desired number, and are, moreover, hollow, having within them fixed upright shafts $f$.

The cylinders obtain their motion by being rigidly connected with the gears $d$.

All the cylinders, such as $e$, are pierced with holes, through which project the spindles $h$.

Within the cylinders $e$ these spindles $h$ are fitted with gears $i$, matching each other, as seen in fig. 3.

Thus the cylinders revolve on vertical shafts or axes in horizontal planes, and carry around with them the spindles $h$, projecting from their periphery. At the same time the spindles, while being thus carried around with the cylinders, revolve on their own axes in vertical planes.

The operation of this part of my invention is as follows:

As the carriage moves over the field, the revolution of the carriage-wheels $a$ imparts motion to the gears $d$, through the gears $k$ and $c$, as before set forth.

The cylinders $e$ are thus put in revolution by the gears $d$, to which they are rigidly attached.

The shafts $f$ have near their lower ends the gears $k$, and therefore, as the cylinders go around, and carry with them the spindles $h$, the gears $i$, matching $k$, and matching each other, give a rotary motion to the spindles. Thus, as the carriage moves, these motions continue, and the spindles $h$, coming in contact with the cotton-boll, and turning as aforesaid, wind out the cotton from the pod, and carry it thus around on to the outside of the machine.

At this place are attached cleaners $m$, under which the spindles pass, after having come in contact with the cotton on the stalk, and by these cleaners the cotton is pushed off from the spindles, and drops into the receiver formed by the guards $n$, and thus the cotton is taken from the stalk and deposited in the machine by the revolution of the cylinders $e$ and the spirals $h$, as the machine passes along over a row of the plants.

I do not intend to limit myself to the precise mechanism, or arrangement thereof, herein shown, for it is apparent that my machine can be made in various forms, and with a multiplicity of gears and cylinders $o$ is a device on the front of the machine, for removing obstacles from its path.

The machine can be drawn or impelled by any animal power.

The cylinders are omitted in the drawing, on one side of fig. 2, for the purpose of showing the gears with more distinctness; but my invention of course, contemplates two rows or sets of cylinders $e$, that is, one on each side of the machine, to operate on each side of a row of cotton-plants.

$p$ show guards over the carriage-wheels.

What I claim as my invention, and desire to secure by Letters Patent, is—

1. A cotton-picking machine, having the revolving cylinders $e$, and revolving spindles $h$, substantially as herein set forth, and operating as described.

2. The combination of the wheels $a$, gears $b$, gears $c$, gears $d$, and cylinders $e$, substantially as and for the purposes set forth, 3. The combination of wheels $a$, gears $b$, gears $c$, gears $d$, cylinders $e$, gears $k$, gears $i$, and spindles $h$, substantially as and for the purposes described.

4. A cotton-picking machine, having the combination of the revolving spindles $h$ and cleaners $m$, substantially as set forth.

5. In combination with the cylinders, spindles, and cleaners, the guards $n$, as described.

ALBERT PETTINGILL.

Witnesses:
 HARRIS GARCELON,
 JOSEPH PETTINGILL.